Figure 1:
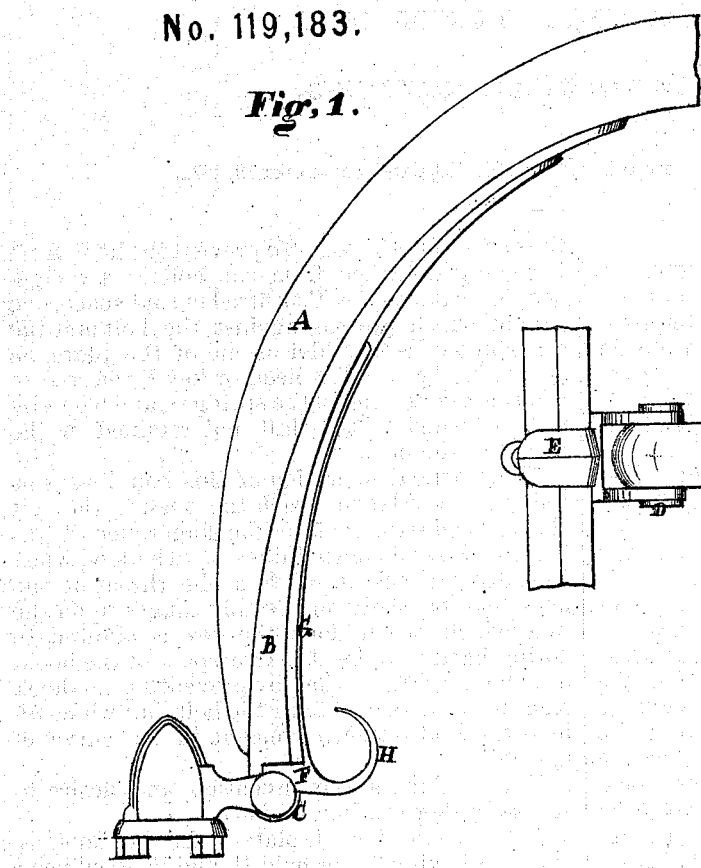

T. H. RYDER.
Carriage Coupling.

No. 119,183.

Patented Sep. 19, 1871.

Inventor.
T. H. Ryder.
per Burridge & Co
Attorneys

Witnesses.
D. L. Humphrey,
Florence Ewing.

UNITED STATES PATENT OFFICE.

TRUMAN H. RYDER, OF MENTOR, OHIO.

IMPROVEMENT IN THILL-COUPLINGS.

Specification forming part of Letters Patent No. 119,183, dated September 19, 1871.

*To all whom it may concern:*

Be it known that I, TRUMAN H. RYDER, of Mentor, in the county of Lake and State of Ohio, have invented certain new and useful Improvements in Carriage-Coupling; and I do hereby declare that the following is a full and complete description of the same, reference being had to the annexed specification and the drawing making a part of the same.

Figure 2:
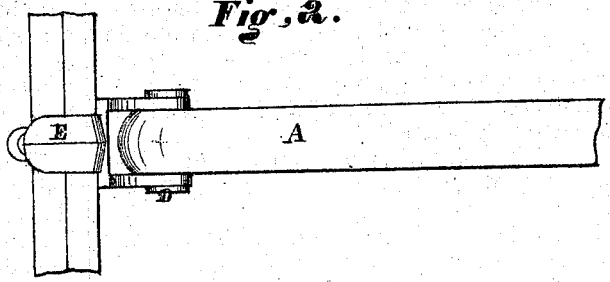
Figure 3:
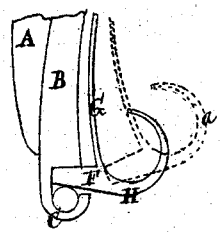
Figure 4:
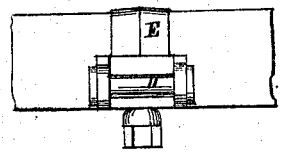

Figure 1 is a side view of the coupling. Fig. 2 is a plan view of the same. Figs. 3 and 4 are detached sections.

Like letters of reference denote like parts in the different views.

The nature of this invention relates to a device for attaching the thills to the axle-tree of a carriage, and the object thereof is to connect them in a ready, safe, and easy manner without the aid of bolts and nuts, and so that they shall be at all times close fitting, and thus prevent the coupling from rattling as the parts may become worn, as hereinafter more specifically described.

In Fig. 1, A represents a section of the thills to which the coupling-iron is secured. Said coupling-iron consists of a thick plate of iron, B, bolted or otherwise secured to the thill, as shown. The lower end of said iron is formed into a hook, C, Fig. 3, whereby it is hooked onto the bolt D, Fig. 4, of the clip E. The throat or distance between the end of the plate and the end of the hook is of sufficient capacity for its admission to the curve of the hook. To prevent the hook from becoming detached from the bolt D a wedge-shaped head, as key F, is fitted in said space, one side of which presses against the bolt and the other upon the shoulder or end of the plate, as shown in Fig. 1. The head or key F referred to is formed on the end of the spring G, and whereby it is attached to the thill and retained in the throat of the hook.

The practical operation of this coupling is as follows: In order to attach the hook to the bolt the key is drawn back by the finger-piece H, as indicated by the dotted lines *a*. The key, when thus drawn back or out from the throat of the hook, can be easily and readily caught upon the bolt, which, when done, the key is allowed to spring back into the throat or space of the hook, as shown in Fig. 1, thereby preventing the hook from being detached from the bolt, but which allows the bolt a free movement in the curve of the hook.

What I claim as my invention, and desire to secure by Letters Patent, is—

The combination of plate B having hook C, spring G having finger-hold H, and inclined head or key F with bolt D in ears on clip E, in the manner and for the purpose described.

TRUMAN H. RYDER.

Witnesses:
    J. H. BURRIDGE,
    D. L. HUMPHREY.